(12) United States Patent
Cole et al.

(10) Patent No.: US 7,690,795 B2
(45) Date of Patent: Apr. 6, 2010

(54) PROJECTOR/CAMERA SYSTEM

(75) Inventors: James R. Cole, Albany, OR (US);
Lonnie D. Mandigo, Corvallis, OR (US); Kenneth H. Bronstein, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 11/544,109

(22) Filed: Oct. 6, 2006

(65) Prior Publication Data
US 2008/0094588 A1    Apr. 24, 2008

(51) Int. Cl.
*G03B 21/26* (2006.01)

(52) U.S. Cl. .................................... 353/30; 348/14.01

(58) Field of Classification Search ............... 353/122, 353/84, 30; 348/14.01–14.16, 742
See application file for complete search history.

(56) References Cited

U.S. PATENT DOCUMENTS

| | | | |
|---|---|---|---|
| 2,850,563 A | 9/1958 | Gretener | |
| 3,821,793 A | 6/1974 | Carson | |
| 3,896,338 A | 7/1975 | Nathanson et al. | |
| 5,153,717 A | 10/1992 | Nitta | |
| 5,400,069 A * | 3/1995 | Braun et al. | 348/14.16 |
| 5,430,476 A | 7/1995 | Hafele et al. | |
| 5,784,038 A | 7/1998 | Irwin | |
| 5,801,758 A | 9/1998 | Heirich | |
| 6,361,173 B1 | 3/2002 | Vlahos et al. | |
| 7,042,486 B2 | 5/2006 | Manico et al. | |
| 2002/0063780 A1* | 5/2002 | Harman et al. | 348/211 |
| 2004/0239755 A1* | 12/2004 | Kjesbu et al. | 348/14.08 |

* cited by examiner

*Primary Examiner*—Georgia Y Epps
*Assistant Examiner*—Jerry Brooks

(57) ABSTRACT

A projector/camera system includes a projector, configured to project a sequenced image to a projection location, and a camera, located at the projection location and oriented to take an image of a region including the projector. The camera is configured to capture a sequenced image that is synchronized and out of phase with the sequenced image of the projector, thereby to minimize light interference from the projector.

16 Claims, 6 Drawing Sheets

|  | FRAME 1 | | | FRAME 2 | | |
|---|---|---|---|---|---|---|
| PROJECTOR | R | G | B | R | G | B |
| CAMERA | B | R | G | B | R | G |

FIG. 6

|  | FRAME 1 | | | | FRAME 2 | | | |
|---|---|---|---|---|---|---|---|---|
| PROJECTOR | R | G | B | W | R | G | B | W |
| CAMERA | B | R | G | K | B | R | G | K |

FIG. 7

PROJECTOR/CAMERA SYSTEM

BACKGROUND

In a collaborative meeting or teaching situation, it is sometimes useful to image the audience using a camera located at the position of the projection screen at which the audience is looking. For example, during a teleconference, where an audience sees an image of a person addressing the audience from a remote location, with a return video image of the audience provided to the speaker, it is desirable that the cameras that view the speaker and the audience be located as near to the respective screens as possible, to provide a realistic appearance. Otherwise, the image provided to the audience is of a speaker not looking directly at the audience, and the image provided to the speaker is of a group of people all looking away.

Placing a video camera at the location of a projection screen presents certain challenges, however. If the screen is illuminated by a front-projector, then light from the projector can interfere with the camera. That is, the field of view of the camera can encompass the light from the projector, allowing light from the projector to interfere with the image taken by the camera. At best this can produce a distracting light spot in the image taken by the camera, and at worst the light spot can substantially wash out the camera image. Although repositioning the projector or re-aiming the camera can in some cases allow one to remove the projector from the camera's field of view while still keeping the camera at the projection position, in many cases this is not possible. Additionally, a camera physically positioned in front of a front projection screen and within the projection region of the projector will cast a shadow on the screen, thus interfering with the projected image.

Some prior approaches to this situation have attempted to physically block or mask light from the projector onto the camera. However, there may be some situations where this cannot be done effectively, due to the geometry of the projector/camera setup and the room or other environment. Additionally, this approach still casts a shadow on the screen, thereby eliminating part of the image, and still requires careful alignment to place the camera in the blanked out region. In cases where the camera is placed behind a transparent or semi-transparent front projection screen, scatter from the screen can still cause image artifacts even with shadowing or masking of the camera position.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein:

FIG. 6 is a table depicting a color sequence that can be used in an embodiment of a projector/camera system in accordance with the present disclosure;

FIG. 7 is a table depicting an alternate color sequence that can be used in an embodiment of a projector/camera system in accordance with the present disclosure;

DETAILED DESCRIPTION

Figure 1:
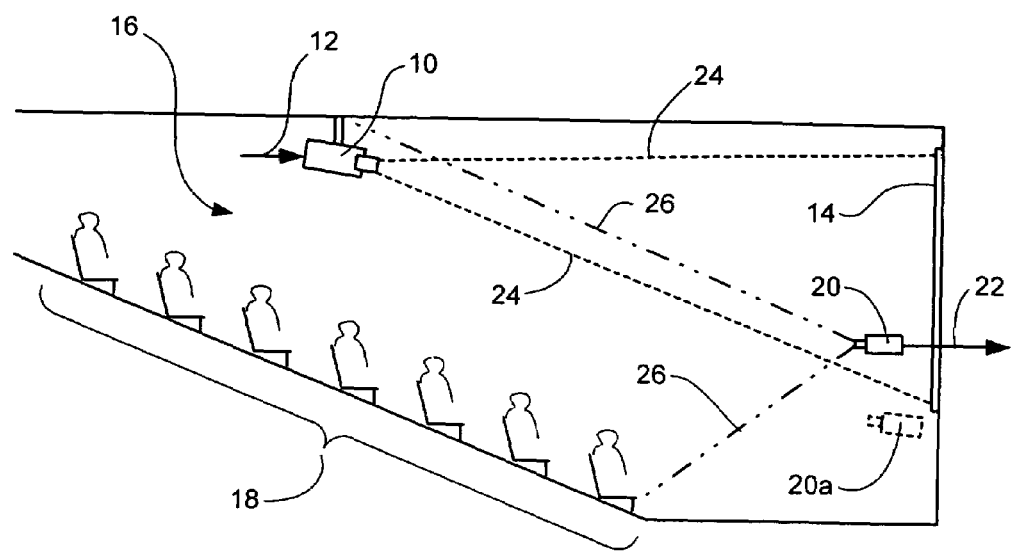
FIG. 1 is a side view of a classroom having a camera projector system wherein the camera is disposed in the projection path of the projector.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

A collaborative meeting or teaching situation is shown in FIG. 1. This can be a remote teaching situation, a video teleconference or the like, where one or more persons at some remote location are involved by video and audio with the people in the room. In the situation depicted in FIG. 1, a projector 10 receives input signals (represented by arrow 12) and projects an image to a projection surface 14, such as a screen, located at the front of the meeting room or classroom 16. The audience 18 is positioned facing the projection surface. The image can be of a teacher, lecturer or other person or things of interest to the audience.

At the same time, to allow remote involvement of one or more persons that are the subject of the projected image, it is useful to image the audience 18 using a camera 20 located at or near the position of the projection screen or other surface 14 at which the audience is looking. The signal from the camera, represented by arrow 22, is directed to the remote location (e.g. via telephone lines, the Internet, etc.) allowing the person(s) at the remote location to see the audience as if in the room 16, and to interact (e.g. discuss and respond to questions) with the audience.

Unfortunately, in the situation shown in FIG. 1, the projector 10 which illuminates the screen is a front-projector (the light from the projector being indicated by dashed lines 24), such that light from the projector can interfere with the camera 20. That is, the field of view of the camera, indicated by dashed lines 26, can encompass the light from the projector. At best, this arrangement can produce a distracting light spot in the image taken by the camera. At worst, the light spot can substantially wash out the entire camera image. This can significantly reduce the quality of the collaborative meeting.

Figure 2:
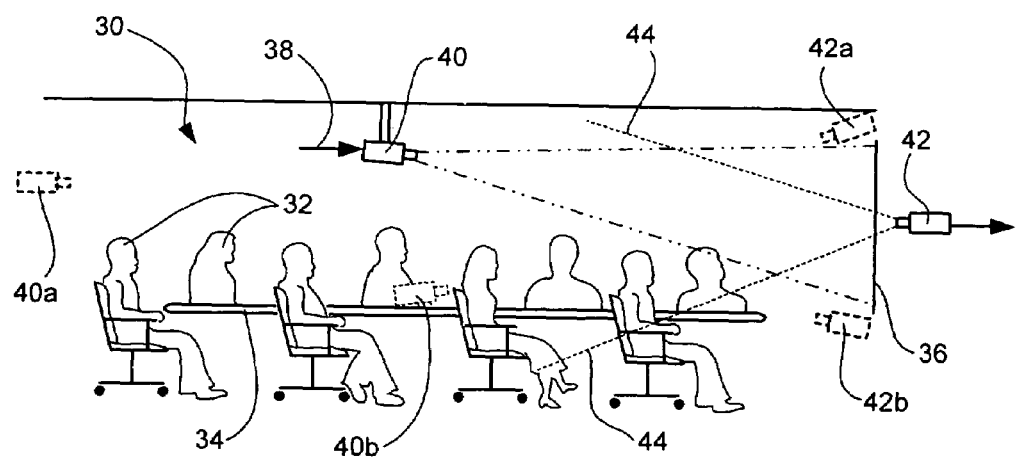
FIG. 2 is a side view of a conference room showing various positions for a camera and projector in a projector/camera system with the camera disposed in the projection path of the projector.

Another collaborative meeting situation is illustrated in FIG. 2. This figure depicts a conference room 30, wherein a group of people 32 are seated around a conference table 34 facing a projection surface 36. A signal 38 is provided to a projector 40, which projects an image to the projection surface. As with the situation of FIG. 1, it is desired to image the people in the conference room. Unlike FIG. 1, however, a camera 42 for taking images of the audience is disposed behind the projection surface, so that the camera can be at the projection location without blocking the projected image from the audience's view. Transparent or semi-transparent front-projection screens through which images can be taken are well known and are commercially available. These screens provide a reflective front surface that allows viewers to see the projected image, but allow some light to pass through the screen to the rear. This allows a camera placed behind the screen to take an image of the audience on the other side while an image is projected onto the front of the screen.

It is to be appreciated that the collaborative meeting situations shown in FIGS. 1 and 2 can be reciprocally connected to similar collaborative meeting arrangements at a distant location. That is, the signal produced by the camera 20 in FIG. 1 can provide the input to a projector at the distant location, such as the projector 40 in the conference room of FIG. 2. Likewise, the projector 10 of FIG. 1 can receive an input signal from a camera at the distant location, such as the camera 42 in the conference room of FIG. 2. It will also be appreciated that the distant or remote location can be very near (e.g. a neighboring room), or very far away (e.g. a distant country). It will also be appreciated that the image projected in the collaborative meeting location can be something other than an image of persons at the remote meeting location, but can comprise a pre-recorded video signal, specialized graphics, or other video content that can be originated at the first meeting location, or transmitted from the distant meeting location.

Unfortunately, while the camera 42 is behind the projection screen 36, light still passes through the screen. Consequently, there can still be substantial light interference from the projector. A number of approaches to resolving the problem of light interference in a projector/camera system have been attempted. One approach involves repositioning the projector or re-aiming the camera. For example, shown in FIG. 1 is an alternate camera 20a that is intended to represent the camera positioned below or to the side of the projection area. The camera could also be located above the projection location or in some other position. Other alternative camera locations are shown in FIG. 2, where an alternate camera 42a is positioned above the projection light region, and another alternate camera 42b is positioned below the projection light region. While this approach can be used to remove the projector from the camera's field of view in some cases, it sacrifices the goal of having the image provided to the remote location be of a group of people looking right at the people that are there.

Another approach is to try to move the projector location, though in some cases this also is not possible or practical. In FIG. 2 an alternate projector 40a is positioned at the back of the conference room 30, and another alternate projector 40b is located on the conference table 34. These are representative of common alternate projector locations. It will be apparent, however, that these alternate projection locations are still within the field of view, represented by dashed lines 44, of the camera 42. Cameras for video conference situations frequently have a relatively wide viewing angle, so that persons close to the camera in a relatively small space can still be easily viewed. Consequently, light interference from a front projector is difficult to eliminate by merely moving either the camera or projector in these types of collaborative meeting arrangements.

Other prior approaches to this type of situation have tried to physically block light from the projector onto the camera, such as by configuring the projector to provide a mask or shadow which blocks light from the location of the camera. Unfortunately, this approach can eliminate part of the projected image (placing a black spot where the camera is located), and still requires careful alignment to place the camera in the blanked out region. Additionally, in cases like FIG. 2, where the camera is placed behind a front projection screen, scatter from the screen can still cause image artifacts even with shadowing or masking of the camera position.

Advantageously, the inventors have developed a projector/camera system in which the camera and projector are synchronized, but are out of phase, to help eliminate light interference from a projector that is aimed at a camera. The projector/camera system is compatible with a classroom setting like that shown in FIG. 1, or a conference room setting like that shown in FIG. 2, or any other situation where a projector is aimed at a camera. The camera and projector can be out of phase in several ways. They can be chromatically out of phase, temporally out of phase, or spatially out of phase.

Figure 3:
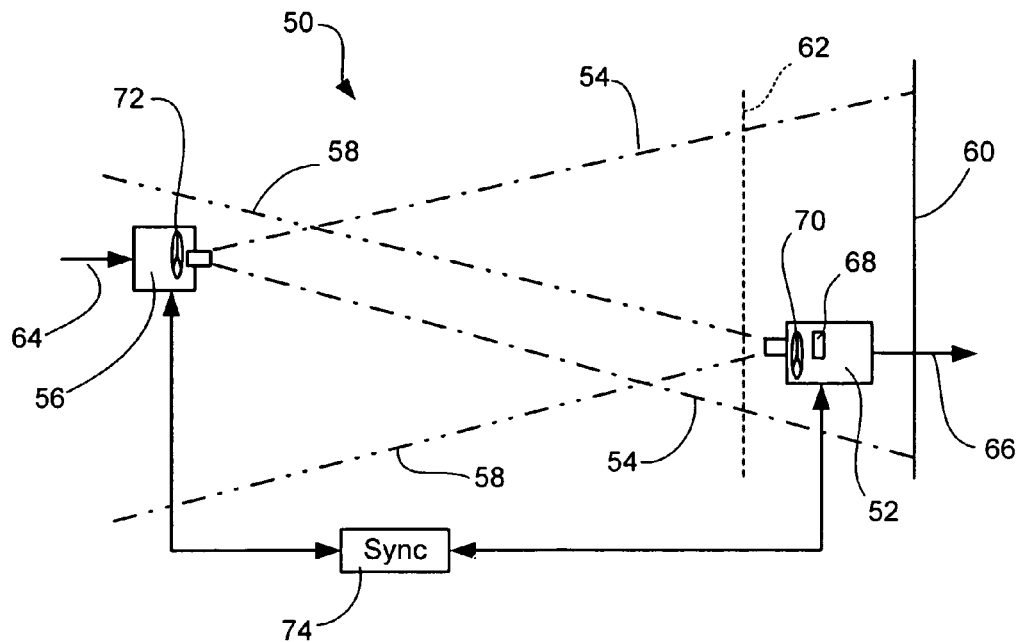
FIG. 3 is a schematic diagram of one embodiment of a projector/camera system in accordance with the present disclosure.

A schematic diagram of a chromatically out-of-phase projector/camera system 50 is shown in FIG. 3. In this configuration, a camera 52 is located within the projection region, indicated by lines 54, of a projector 56, and the imaging region, represented by lines 58, includes the position of the projector. The camera is located in front of a front projection screen 60. Alternatively, the camera can be located behind a transparent or semi-transparent front projection screen 62. An input signal, represented by arrow 64, is provided to the projector, and an output signal, represented by arrow 66, is produced by the camera.

The camera 52 includes a light sensor 68 and a color wheel 70, and takes images sequentially. The color wheel includes multiple color filter segments, and causes the camera to take a sequence of individual component color images that are blended to produce a full color image. The projector 56 is a sequential color projector, and also includes a color wheel 72 having a series of color filter segments. The color wheel rotates rapidly to cause the projector to project a sequence of component color images, which are perceived by viewers as a single full color image.

Figure 4:
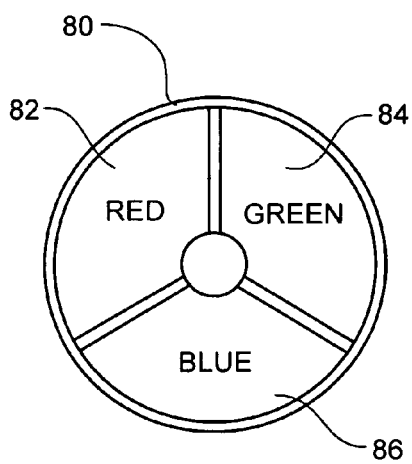
FIG. 4 is a plan view of a three-segment color wheel that can be used with a camera or projector in an embodiment of a projector/camera system in accordance with the present disclosure.
Figure 5:
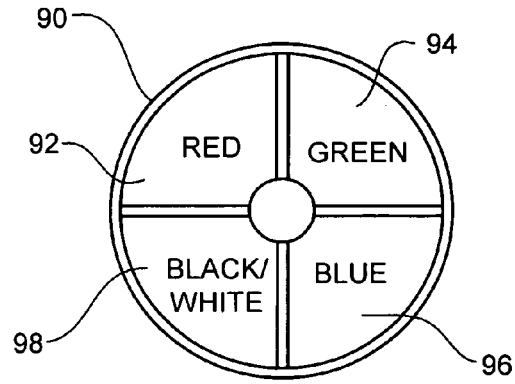
FIG. 5 is a plan view of a four-segment color wheel that can be used with a camera or projector in an embodiment of a projector/camera system in accordance with the present disclosure.

Sequential color projectors and cameras using rotating color wheels are well known and commercially available. Examples of color wheels that can be used for sequential color projection are shown in FIGS. 4 and 5. A three-color color wheel 80 is shown in FIG. 4. This color wheel includes three color filter segments including a red segment 82, a green segment 84, and a blue segment 86, corresponding to the well known RGB color sequence used in color video. In this color wheel, each filter segment occupies an equal portion of the wheel (e.g. 120°).

The light filter segments of the color wheel sequentially pass in front of the projection light path as the color wheel rotates very rapidly, so as to produce sequential red, blue, and green sub-portions of a single image frame. For example, during each image frame of a video image (each image frame lasting, e.g. 1/30 second), a white light source in the projector will sequentially project three different sub-images (each lasting e.g. 1/90 second) through the color wheel filters in sync with the rotation of the color wheel. For example, the sub-image that is projected while the red filter segment of the color wheel is in the projection path will correspond to the red portions of the final image, the sub-image portion that passes through the green segment of the color wheel corresponds to green portions of the final image, and the sub-image portion that is projected while the blue segment of the color wheel is in the projection path corresponds to blue portions of the final image. Given the speed of projection of the three color images, the viewer does not perceive three different colors at different times, but instead sees a single image including the entire range of visible colors.

Another example of a color wheel is provided in FIG. 5. This color wheel 90 includes four color segments, including a red segment 92, a green segment 94, a blue segment 96, and a black or while segment 98, each segment occupying approximately one third of the color wheel. The term "black" as used with respect to the color wheel is intended to refer to an opaque or reflective segment which blocks or reflects substantially all projected light. This can be a segment of a solid metal piece (e.g. a piece of aluminum) or other material (e.g. glass) that has been treated to cause it to block light or to reflect light away from the projection path (e.g. to a light dump). The term "white" is intended to refer to a piece of clear or transparent material (e.g. clear glass or plastic) that passes substantially all light that is projected to it. It will be apparent that the three and four-segment color wheels shown in FIGS. 4 and 5 are only exemplary, and that color wheels having different numbers and types of filter segments can also be used to produce sequential color images.

Referring back to FIG. 3, the color wheel 72 in the projector 56 causes the projector to sequentially project the component color images to the projection screen 60, providing an image on the screen that is visible to the audience. The camera 52 is a sequential-color camera that also includes a rotating color wheel 70, and operates analogously to the sequential color projector. One type of sequential color camera is designed with a rotating color wheel in the optical path. For each frame the camera takes, the wheel rotates an integer number of times. The color filters on the wheel are designed to filter out all but a desired color. For example, the red filter on the camera accepts only red light, and rejects blue and green.

The color wheel 70 of the camera is operationally linked with the color wheel 72 of the projector via a synchronization device 74, which simultaneously controls the speed of rotation and the relative positions of the color filters of the two color wheels. It is common for display systems (cameras and displays) to have a "genlock" capability, wherein one device generates a timing signal which is accepted by other devices in order for their video processing (frame rates) to be synchronized. The synchronization device 74 represents the components required to provide this capability, and though shown in FIG. 3 as a separate component of the system, these components can be part of the camera 52 or of the projector 56, or both. By virtue of the synchronization device, the frame rate of the camera is matched to the frame rate of the projector, and the color wheel rotation rate of the camera is synchronized with the color wheel rotation rate of the projector.

The color wheels in the projector and camera can be of identical design (i.e. having the same number and sequence of color filters), and rotate at the same frequency, but are caused to rotate out of phase. That is, when the projector is projecting a given color in its sequence, the camera is filtering out that color and imaging a different color. This is done for each color in sequence. As noted above, the color filters on the color wheel 70 of the camera 52 are designed to accept only the equivalent colors from the projector. Thus, the red filter on the camera accepts only the red light from the projector, and rejects blue and green. It is not necessary for the band passes to be identical, so long as rejection of the alternate colors is adequate. It is also not necessary for the color wheel segments of the camera to be as large as the projector's. They can be somewhat smaller in order to simplify timing.

An example of two simultaneous but out of phase color sequences for a projector/camera system wherein the camera and projector each have a three-segment color wheel having red (R), green (G) and blue (B) segments, is provided in FIG. 6. This table shows the color wheel positions during two successive image frames, labeled "Frame 1" and "Frame 2". During a first portion of Frame 1, the red ("R") filter segment of the projector color wheel is positioned in the projection path, so that the projector projects the red portion of the image frame, followed successively by the green ("G") and blue ("B") image components. This same projection sequence also follows in Frame 2.

The camera, on the other hand, takes the red, green and blue images in the same order, but shifted by one step in the sequence. That is, while the projector is projecting a red image, the camera is imaging a blue ("B") image, followed by red ("R") and green ("G"), while the projector projects green and blue, respectively. The same color projection and imaging procedure follows for Frame 2. Because the camera 56 and projector 54 are out of phase, the camera will not capture any light coming from the projector.

Another example of a projection sequence for a chromatically out-of-phase projector/camera system is shown in the table of FIG. 7. In this exemplary sequence, the camera and projector each have a four-segment color wheel. The color wheel of the projector includes red (R), green (G), blue (B) and white (W) segments, while the color wheel of the camera includes red (R), green (G), blue (B) and black (K) segments in a different order. During each image frame, the projector projects a sequence of R-G-B-W, while the camera sequentially images B-R-G-K. As with the example of FIG. 6, since the color sequences of the camera and projector are out of phase, the camera will not capture any light coming from the projector.

A white portion of a projection sequence in a sequential color projector is often provided to increase the overall brightness of the projected image. During the white sub-frame, image data that is roughly equivalent to a "black and white" version of the background image is provided for parts of the scene that are fairly bright. This white image enhances the brightness of the image overall. A white color sub-frame can be desirable in a camera/projector system of this type in order to compensate for ambient lighting. The increased brightness makes the projected image more easily visible in a room in which the lights are not dimmed.

Since white light projected during the white sub-frame cannot be eliminated by a color filter segment, the color wheel in the camera includes a black (K) segment which is timed to block all light to the camera during the white phase. The black segment of the color wheel in the camera is part of the image-forming process during a frame, and is not really perceivable by a user. No specific compensation is needed in the camera or processor to account for the black segment. Due to the color wheel (including the color portions), the image captured by the camera will tend to be a little darker, but this is a common situation. Compensation for this condition can be easily provided by "faster" camera optics.

As noted above, in addition to varying the color sequence, the temporal sequence of projection and camera imaging can be shifted out of phase to eliminate light interference between a camera and projector. Specifically, the projection of the projector and imaging of the camera can be temporally out of phase (without respect to color), so that the projector only projects an image part of the time, and the camera only captures an image part of the time, the two time intervals being opposite each other.

Figure 8A:
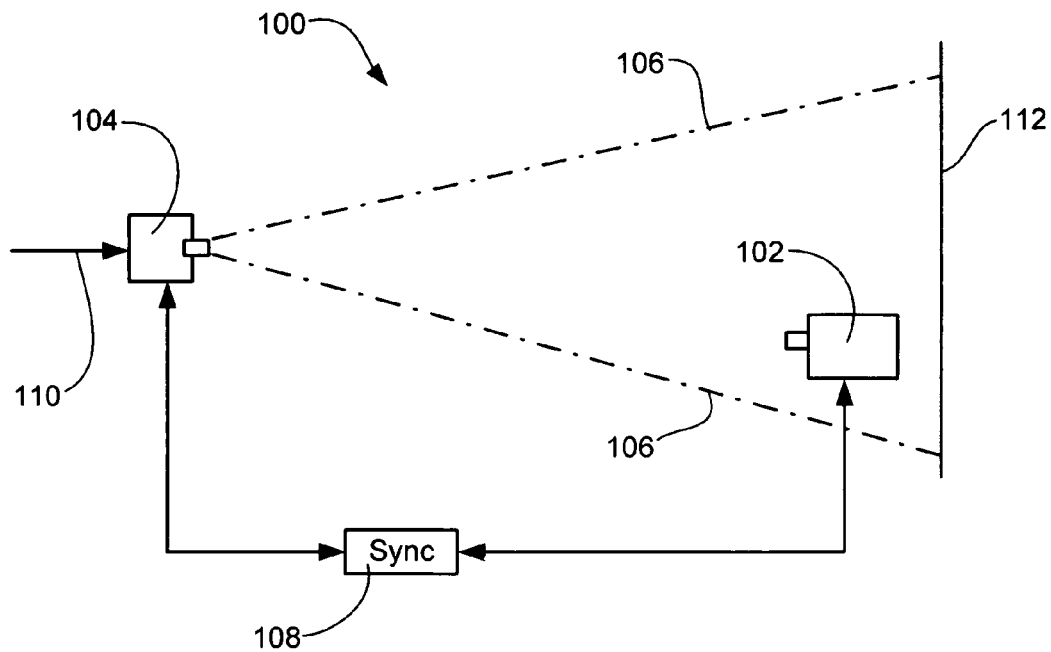
FIGS. 8A and 8B are schematic diagrams of one embodiment of a temporally out-of-phase projector/camera system in accordance with the present disclosure.
Figure 8B:
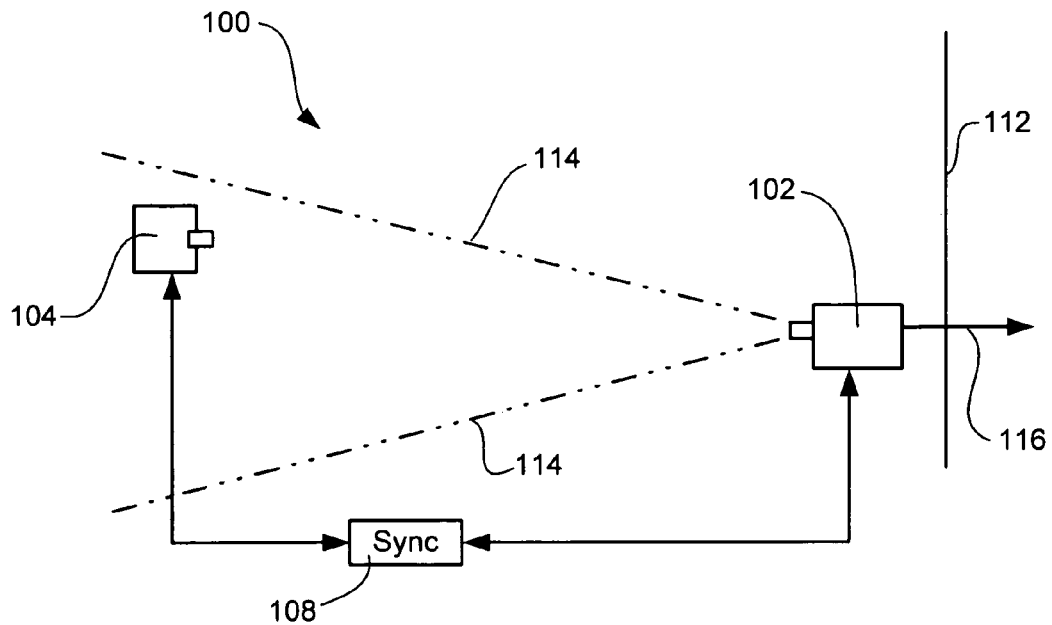

An example of a temporally out-of-phase projector camera system 100 is depicted in FIGS. 8A and 8B. In this system the camera 102 is aimed at the projector 104 and is disposed within the projection region, represented by dashed lines 106. The camera and projector are interconnected by a synchronization device 108, which controls the timing of operation of the two devices.

At the time instant shown in FIG. 8A, the projector 104 is receiving a signal, represented by arrow 110, and producing an image, which is projected to the screen 112 and is visible to viewers in the location of the projector. However, at that instant, the camera 102 is not taking an image. A subsequent time interval is illustrated in FIG. 8B, wherein the projector 104 is not projecting an image, but the camera 102 is producing an image from its field of view, represented by dashed lines 114, and sending a corresponding signal, represented by arrow 116.

The projection interval, illustrated in FIG. 8A, and the imaging interval, represented in FIG. 8B, are very rapid and alternate with each other, so that the camera 102 does not "see" the projected image, but people in the room with the projector do. The timing of these intervals is governed by the synchronization unit 108, which interconnects the camera and the projector. The duration of the imaging and projection intervals can vary, and the two intervals can be different lengths. Moreover, while the configuration depicted in FIGS. 8A and 8B suggests two successive intervals, a different pattern of intervals can be used.

Figure 9A:
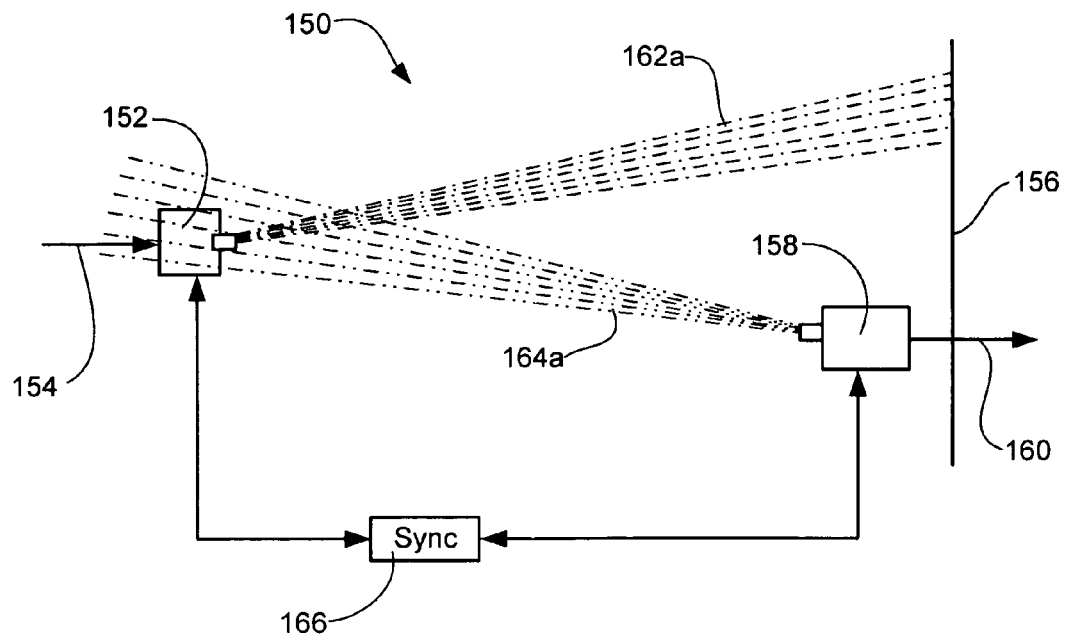
FIGS. 9A and 9B are schematic diagrams of one embodiment of a spatially out-of-phase projector/camera system in accordance with the present disclosure.
Figure 9B:
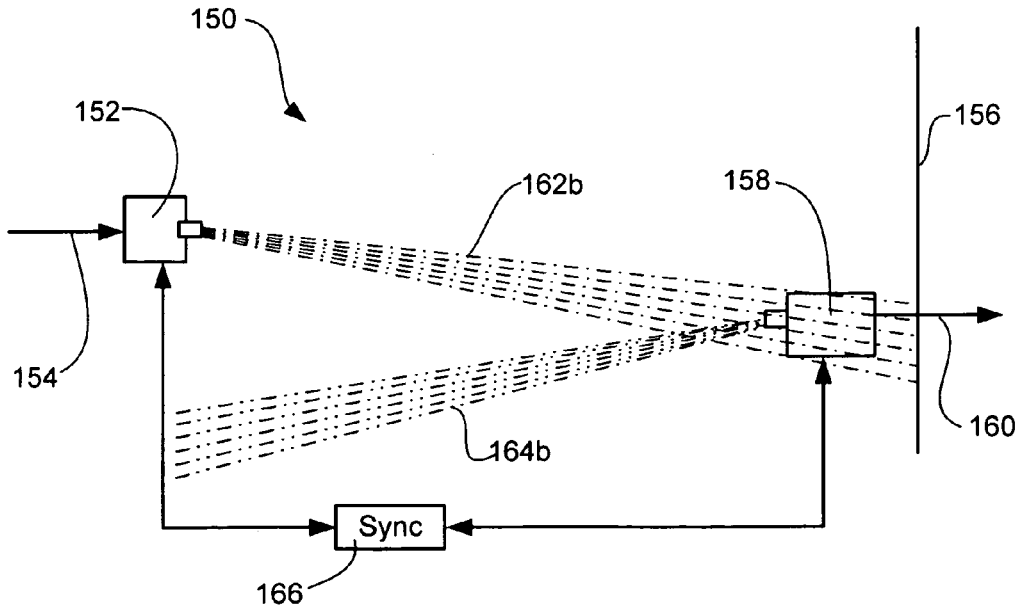

As yet another alternative, the camera and projector can be spatially out of phase. One embodiment of a spatially out-of-phase camera/projector system 150 is shown in FIGS. 9A and 9B. As with the embodiments that are described above, a projector 152 receives an image signal 154 and projects an image to a front projection screen 156, while a camera 158 simultaneously takes an image of the area that includes the projector, and sends out a corresponding signal 160.

Unlike the other embodiments described above, however, the camera 158 and projector 152 are configured to scan their images in a spatial sequence. For example, the projector can be a scanning laser projector, which produces a moving image by repeatedly scanning horizontal lines of pixels from the top of the screen to the bottom. Likewise, the camera can be configured to take an image in a corresponding way, scanning horizontal lines of pixels repeatedly from top to bottom. The successive scanning lines of the projector are indicated generally by lines 162, and the successive scanning positions of the camera are indicated generally by lines 164.

Where both the camera 158 and projector 152 deal with images by spatially scanning in this way, the two devices can be coordinated to scan at a common frequency, but out of phase. That is, as shown in FIG. 9A, the projector can be configured to project its image toward the top region of the screen 156 (away from the camera), indicated by lines 162a, while the camera scans the portion of its field of view that includes the projector, indicated by lines 164a. Since the projector is not actively projecting light toward the location of the camera at that time, light interference will be reduced. Conversely, referring to FIG. 9B, when the image scanning region from the projector 152 covers the location of the camera 158, indicated by lines 162b, the camera can be imaging a lower region of its field of view, indicated by lines 164b. Once again, since the camera is not taking an image of the region of the projector at the time the projector is projecting light toward the camera, light interference will be reduced.

The spatial scanning of the camera 158 and projector 152 is controlled by a synchronization device 166, which ensures that the two devices operate at the same frequency, but out of phase. Thus the camera will not detect the image that is projected to the screen because its projection at any given time will be toward a different location of the screen than where the camera is taking an image. It is to be noted that the system is not limited to a top-to-bottom scanning configuration. A variety of spatially out-of-phase scanning configurations can be used. For example, the camera and projector can scan from side to side, rather than from top to bottom, or in any one of many other scanning modes.

Figure 10:
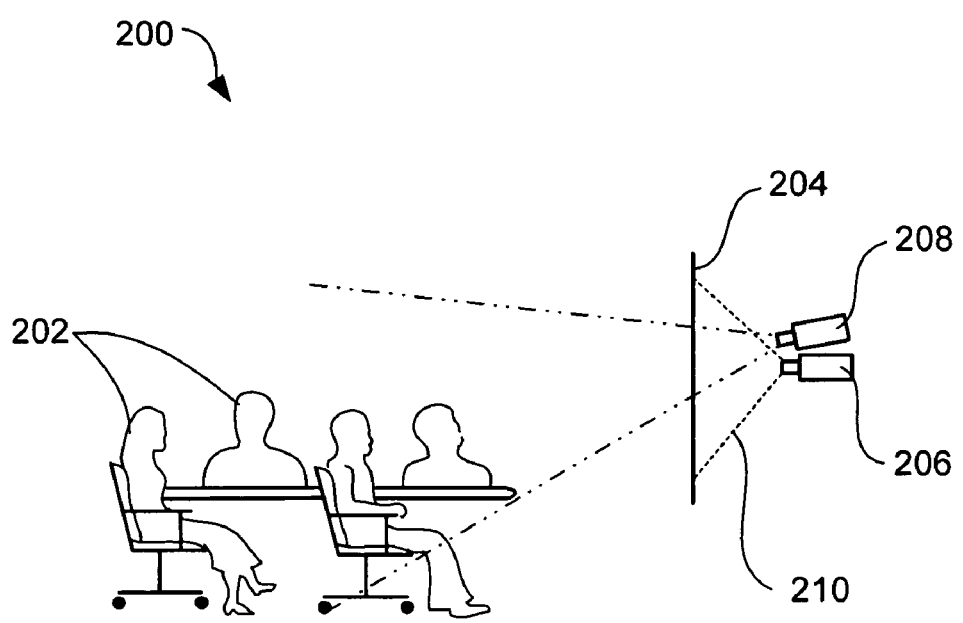
FIG. 10 is a side view, semi-schematic diagram of an embodiment of a projector/camera system associated with a conference room having a see-through rear projection screen with both the camera and projector located behind the screen.

Yet another embodiment of an out-of-phase camera/projector system is illustrated in FIG. 10. In this camera/projector system 200, a group of people 202, such as in a conference room or the like, view an image on a rear projection screen 204. The image on the rear projection screen is provided by a rear projection camera 206, which is disposed behind the screen. Advantageously, the rear projection screen is transparent or semi-transparent, allowing the camera 208 to be located behind the screen also. The camera takes an image of the group of people (or other objects in the room), while the projector provides the image for viewing upon the screen.

The relative positions of the camera 208 and projector 206 behind the screen 204 can be manipulated to avoid the camera casting a shadow upon the screen. That is, the camera can be placed outside of the light cone 210 of the projector. There are many ways this can be done. One example is shown in FIG. 10, where the projector is a short throw projector, configured with wide angle optics to project an image to a screen at very close range, and is located generally centrally behind the screen, while the camera is placed just above the projector. The camera can have optics (e.g. narrower angle) that are configured to provide a suitable image from its vantage point. As another alternative (not shown), the projector can be located above, below, or to the side of the center of the screen, while projecting its image to the center of the screen (with proper keystone correction). The camera can then be placed pointing straight toward and looking through the center of the screen. The rear screen configuration also provides the advantage that persons 202 viewing the image on the screen can approach the front of the screen and stand near the screen without casting a shadow upon it.

Transparent or semi-transparent rear projection screens are well known and commercially available from a variety of sources. While rear projection screens are configured to produce an image on their front side, when a standard diffusive rear-projection screen is used, an image is also visible from the rear. Attempting to capture an image with a camera looking through a rear projection screen would thus ordinarily present the same problem as with a transparent front-projection screen: the projected image would tend to interfere with the camera capture. With the camera/projector system disclosed herein, however, the camera 208 is a sequential camera, and the projector 206 is a sequential projector, and these are out of phase (either chromatically, temporally, or spatially) in the manner described above. That is, images taken by the camera are out of phase with images projected to the screen by the projector so that the camera does not "see" the image projected to the screen. The projected image is always out of phase (either chromatically, temporally, or spatially) with the image capture of the camera, allowing the camera to operate without light interference from diffuse images visible on the rear of the screen.

With the system disclosed herein, in its various embodiments, light interference from the projector can be reduced or eliminated without significantly affecting the quality of the scene to be imaged. Advantageously, the projector can operate at full brightness, without being modified.

The out-of-phase projector/camera system thus provides a system where the camera can be located within the projection area of a projector without experiencing light interference. The camera takes images in a specific color, temporal or spatial sequence that is out of phase with a sequence of light projected by the projector, so that light interference from the projector is reduced or eliminated without affecting the quality of the scene to be imaged by the camera.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A projector/camera system, comprising: a projector, configured to project a sequenced image to a projection location; and a camera, located at the projection location and oriented to take an image of a region including the projector, the camera being configured to capture a sequenced image that is synchronized and chromatically out of phase with the sequenced image of the projector, thereby to minimize light interference from the projector.

2. A system in accordance with claim 1, wherein the camera and projector each include a rotating color wheel having corresponding color filter segments, the rotation of the color wheel of the projector being synchronized and out of phase with the rotation of the color wheel of the camera.

3. A system in accordance with claim 2, wherein the color wheels in the camera and projector each include red, green, and blue filter segments.

4. A system in accordance with claim 2, wherein the color wheel in the projector includes red, green, blue and white filter segments, and the color wheel in the camera includes red, green, blue and black filter segments.

5. A system in accordance with claim 1, wherein the projection location comprises a transparent or semi-transparent front projection screen, the projector being located in front of the screen, and the camera being located behind the screen.

6. A system in accordance with claim 1, wherein the projection location comprises a transparent or semi-transparent rear projection screen, and the projector and camera are both located behind the screen.

7. A system in accordance with claim 1, further comprising:
a remote projector, configured to receive an image signal from the camera, and to project an image based upon the image signal to a remote projection location; and
a remote camera, configured to provide an image to the projector.

8. A system in accordance with claim 7, wherein the remote projector is configured to project a sequenced image to the remote projection location, and the remote camera is oriented to take an image of a region including the remote projector, the remote camera being configured to capture and provide a sequenced image that is out of phase with the sequenced image of the remote projector, thereby to minimize light interference from the remote projector.

9. A video conferencing system, comprising: a first projector, configured to project a sequenced image to a first projection location; a first camera, located at the first projection location and oriented to take an image of a region including the first projector, the first camera being configured to capture a sequenced image that is synchronized and chromatically out of phase with the sequenced image of the first projector, thereby to minimize light interference from the projector; a second projector, configured to receive an image signal from the first camera, and to project an image based upon the image signal to a second projection location; and a second camera, configured to provide an image to the first projector.

10. A video conferencing system in accordance with claim 9, wherein the first camera and first projector are chromatically out of phase and each include a rotating color wheel having corresponding color filter segments, the rotation of the color wheel of the first projector being synchronized and out of phase with the rotation of the color wheel of the first camera.

11. A video conferencing system in accordance with claim 9, wherein the second projector is configured to project a sequenced image to the second projection location, and the second camera is oriented to take an image of a region including the second projector, the second camera being configured to capture and provide a sequenced image that is synchronized and out of phase with the sequenced image of the second projector, thereby to minimize light interference from the second projector.

12. A video conferencing system in accordance with claim 9, wherein the first projection location comprises a transparent or semi-transparent front projection screen, the first projector being located in front of the screen, and the first camera being located behind the screen.

13. A method for reducing light interference in a system having a projector, configured to project an image to a projection location, and a camera, located at the projection location and oriented to take an image of a region including the projector, comprising the steps of: projecting a sequenced image with the projector; and capturing a sequenced image with the camera, the sequenced image of the camera being synchronized and chromatically out of phase with the sequenced image of the projector, such that light interference from the projector to the camera is reduced.

14. A method in accordance with claim 13, wherein the step of projecting a sequenced image with the projector comprises projecting a series of component images through a series of color filter segments of a rotating projector color wheel, and the step of capturing a sequenced image with the camera comprises capturing a series of component images through a series of color filter segments of a rotating camera color wheel, and further comprising the step of
synchronizing the rotation of the projector color wheel and the camera color wheel so that the color wheels rotate at a common frequency and out of phase, such that light projected by the projector is substantially not detected by the camera.

15. A method in accordance with claim 13, further comprising the steps of:
transmitting a camera image signal from the camera to a remote projector at a remote projection location; and
receiving a projector image signal from the remote projection location, and causing the projector to project an image based upon the projector image signal.

16. A method in accordance with claim 13, further comprising the step of placing the camera behind a transparent or semi-transparent front projection screen toward which the projector is oriented.

* * * * *